(12) United States Patent
Kanno et al.

(10) Patent No.: US 10,871,392 B2
(45) Date of Patent: Dec. 22, 2020

(54) PROTECTIVE COVER FOR WEIGHING INSTRUMENT WITH SUSPENDED SLIDING DOOR

(71) Applicant: A&D COMPANY, LIMITED, Tokyo (JP)

(72) Inventors: Masahiro Kanno, Saitama (JP); Shunsuke Kasamatsu, Saitama (JP)

(73) Assignee: A&D COMPANY, LIMITED, Tokyo (JP)

( * ) Notice: Subject to any disclaimer, the term of this patent is extended or adjusted under 35 U.S.C. 154(b) by 188 days.

(21) Appl. No.: 16/302,161

(22) PCT Filed: Jul. 26, 2016

(86) PCT No.: PCT/JP2016/071871
§ 371 (c)(1),
(2) Date: Nov. 16, 2018

(87) PCT Pub. No.: WO2018/020579
PCT Pub. Date: Feb. 1, 2018

(65) Prior Publication Data
US 2019/0162587 A1 May 30, 2019

(51) Int. Cl.
| | | |
|---|---|---|
| G01G 21/28 | (2006.01) | |
| G01G 21/30 | (2006.01) | |
| A47K 3/34 | (2006.01) | |
| E06B 3/92 | (2006.01) | |
| E05D 15/06 | (2006.01) | |

(52) U.S. Cl.
CPC ....... *G01G 21/286* (2013.01); *E05D 15/0621* (2013.01); *G01G 21/28* (2013.01); *G01G 21/30* (2013.01); *A47K 3/34* (2013.01); *E05Y 2900/608* (2013.01); *E06B 3/922* (2013.01)

(58) Field of Classification Search
CPC ...... G01G 21/286; G01G 21/28; G01G 21/30; A47K 3/34; E06B 3/922; E05D 15/0621; E05Y 2900/608
See application file for complete search history.

(56) References Cited

U.S. PATENT DOCUMENTS

| | | | | |
|---|---|---|---|---|
| 4,700,793 A | * | 10/1987 | Luchinger | G01G 21/286 177/181 |
| 5,264,667 A | * | 11/1993 | Luechinger | G01G 21/286 177/124 |
| 7,531,759 B2 | * | 5/2009 | Luchinger | G01G 21/286 177/180 |

FOREIGN PATENT DOCUMENTS

| | | |
|---|---|---|
| JP | 62-140328 U1 | 10/1986 |
| JP | 09-015031 A | 1/1997 |
| JP | 2000-170435 A | 6/2000 |

(Continued)

*Primary Examiner* — Randy W Gibson
(74) *Attorney, Agent, or Firm* — Roberts Calderon Safran & Cole P.C.

(57) ABSTRACT

Provided is a protective cover for a weighing instrument in which movement of a sliding door does not degrade over time. A protective cover (2) for a weighing instrument includes sliding doors (2L, 2R) defining a weighing chamber (5), an upper frame (11) formed at an upper edge of the sliding door, a lower frame (12) formed at a lower edge of the sliding door, an upper guide rail (17) disposed on the upper frame, and a lower guide rail (18) disposed under the lower frame, where the upper guide rail suspends the upper frame, and between the upper guide rail and the upper frame, balls (215) are disposed at a plurality of positions in a moving direction of the sliding door.

9 Claims, 7 Drawing Sheets

(56) References Cited

FOREIGN PATENT DOCUMENTS

| | | |
|---|---|---|
| JP | 2005-133286 A | 5/2005 |
| JP | 2006-030188 A | 2/2006 |
| JP | 2008-209141 A | 9/2008 |

\* cited by examiner

PROTECTIVE COVER FOR WEIGHING INSTRUMENT WITH SUSPENDED SLIDING DOOR

CROSS-REFERENCE TO RELATED APPLICATIONS

The present application is a U.S. National Phase of PCT/JP2016/071871 filed on Jul. 26, 2016. The disclosure of the PCT Application is hereby incorporated by reference into the present Application.

TECHNICAL FIELD

The present invention relates to a sliding protective cover for a weighing instrument.

BACKGROUND ART

A weighing instrument such as an electromagnetic balance type electronic scale and a high-precision load cell type electronic scale are capable of measuring a micro mass, however, they are accordingly greatly influenced by a disturbance caused by an air flow around a weighing pan. Therefore, a protective cover covering the surroundings of the weighing pan is used. A protective cover frequently used for such a high-precision weighing instrument is structured to be placed on a weighing instrument main body so as to be integrated with the weighing instrument main body, and the protective cover as a whole is mainly formed of a glass plate, and the glass plate can be slid to be opened/closed.

The applicant previously proposed a protective cover which was formed in its entirety into a substantially cylindrical shape, a part of a side wall of which functions as a sliding door, and configured so that upper and lower end portions of the sliding door were movable along guide rails formed on bases disposed at the upper and lower sides of the sliding door, projections were formed on a surface at the lower end portion of the sliding door, the weight of the sliding door was supported by the projections, and the projections came into sliding contact with a horizontal surface of the guide rail, and accordingly, a sliding resistance when the door was opened and closed was reduced to realize smooth opening and closing of the sliding door (Patent Literature 1).

CITATION LIST

Patent Literature

[Patent Literature 1] Japanese Published Unexamined Patent Application No. 2008-209141

SUMMARY OF THE INVENTION

Technical Problem

However, the protective cover described in Patent Literature 1 has a problem in which, since the sliding door is supported by the lower base, movement of the sliding door degrades over time as samples spill and accumulate on the guide rail of the lower base, and this problem has not been solved.

The present invention was made in response to the problem in the conventional technology, and an object thereof is to provide a protective cover for a weighing instrument in which movement of the sliding door does not degrade over time.

Solution to Problem

In order to solve the above-described problem, a protective cover for a weighing instrument according to an aspect of the present invention includes a sliding door defining a weighing chamber, an upper frame formed at an upper edge of the sliding door, a lower frame formed at a lower edge of the sliding door, an upper guide rail disposed on the upper frame, and a lower guide rail disposed under the lower frame, in which the upper guide rail suspends the upper frame, and between the upper guide rail and the upper frame, balls are disposed at a plurality of positions in a moving direction of the sliding door.

In the aspect described above, it is also preferable that, for the balls, at each of the plurality of positions, a pair of balls are disposed respectively on a side of the weighing chamber and a non-weighing chamber side not being the weighing chamber side.

In the aspect described above, it is also preferable that, on an upper surface of the upper frame, at each of the plurality of positions, a roller portion is formed having a pair of holding portions for holding the balls in a rollable manner on the weighing chamber side and the non-weighing chamber side not being the weighing chamber side, and the upper guide rail suspends the roller portion.

In the aspect described above, it is also preferable that a lower end portion of the lower frame does not come into contact with a bottom surface of the lower guide rail.

In the aspect described above, it is also preferable that a through-hole is formed in a bottom surface of the lower guide rail.

In the aspect described above, it is also preferable that a wall portion of the lower guide rail positioned on the non-weighing chamber side not being a side of the weighing chamber is formed to become longer downward than a wall portion positioned on the weighing chamber side.

In the aspect described above, it is also preferable that the sliding door is formed by turnably connecting three plates juxtaposed to each other in a moving direction of the sliding door.

Effect of the Invention

According to the protective cover for a weighing instrument of the present invention, the sliding door is top-railed, so that even when a contaminant falls onto the lower guide rail, smooth movement of the sliding door is maintained.

BRIEF DESCRIPTION OF THE DRAWINGS

FIGS. 4A and 4B are views illustrating states of sliding of the right sliding door of the protective cover in FIG. 1.

DESCRIPTION OF EMBODIMENTS

A preferred embodiment of the present invention is described with reference to the drawings.

Figure 1:
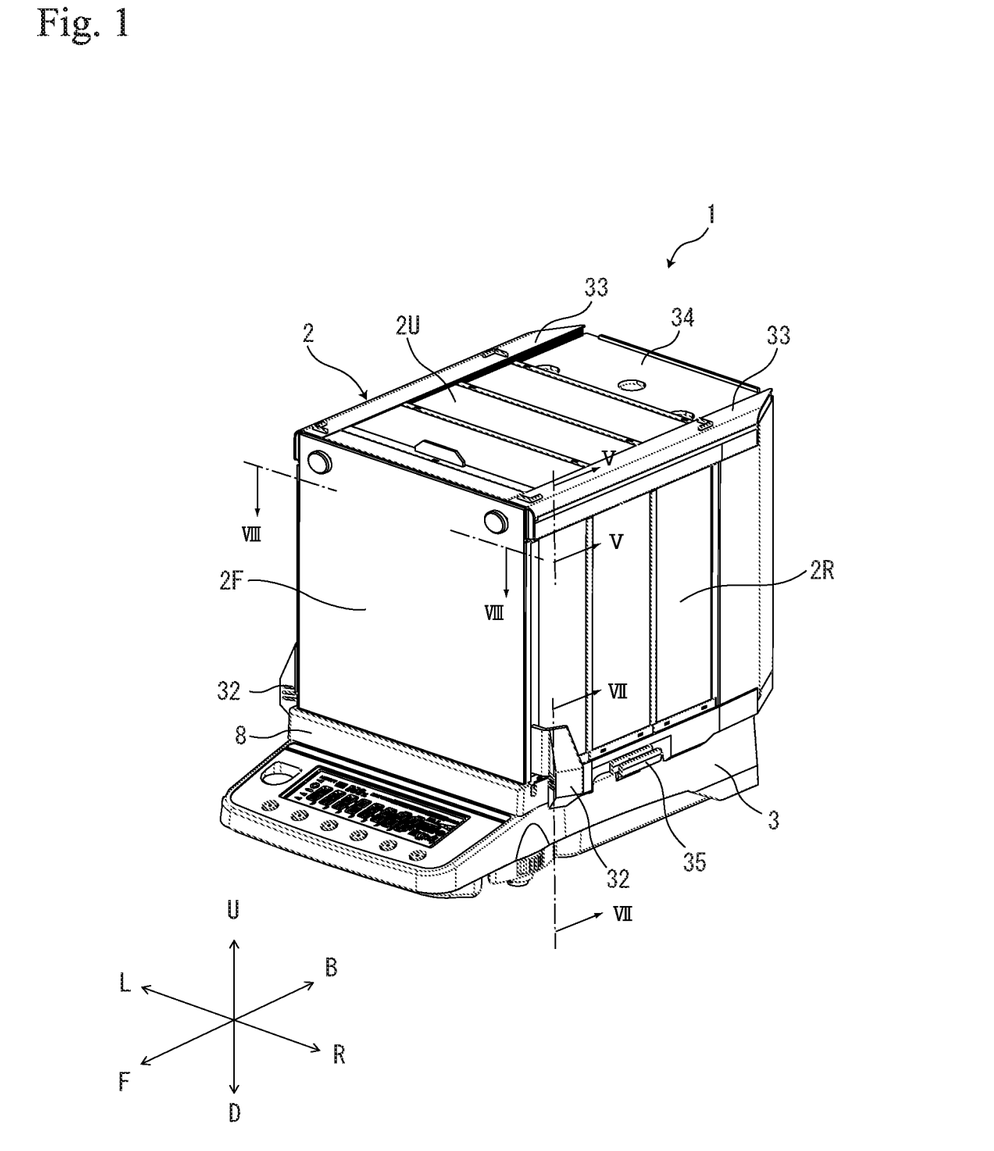
FIG. 1 is a right perspective view of an electronic scale including a protective cover according to an embodiment.
Figure 2:
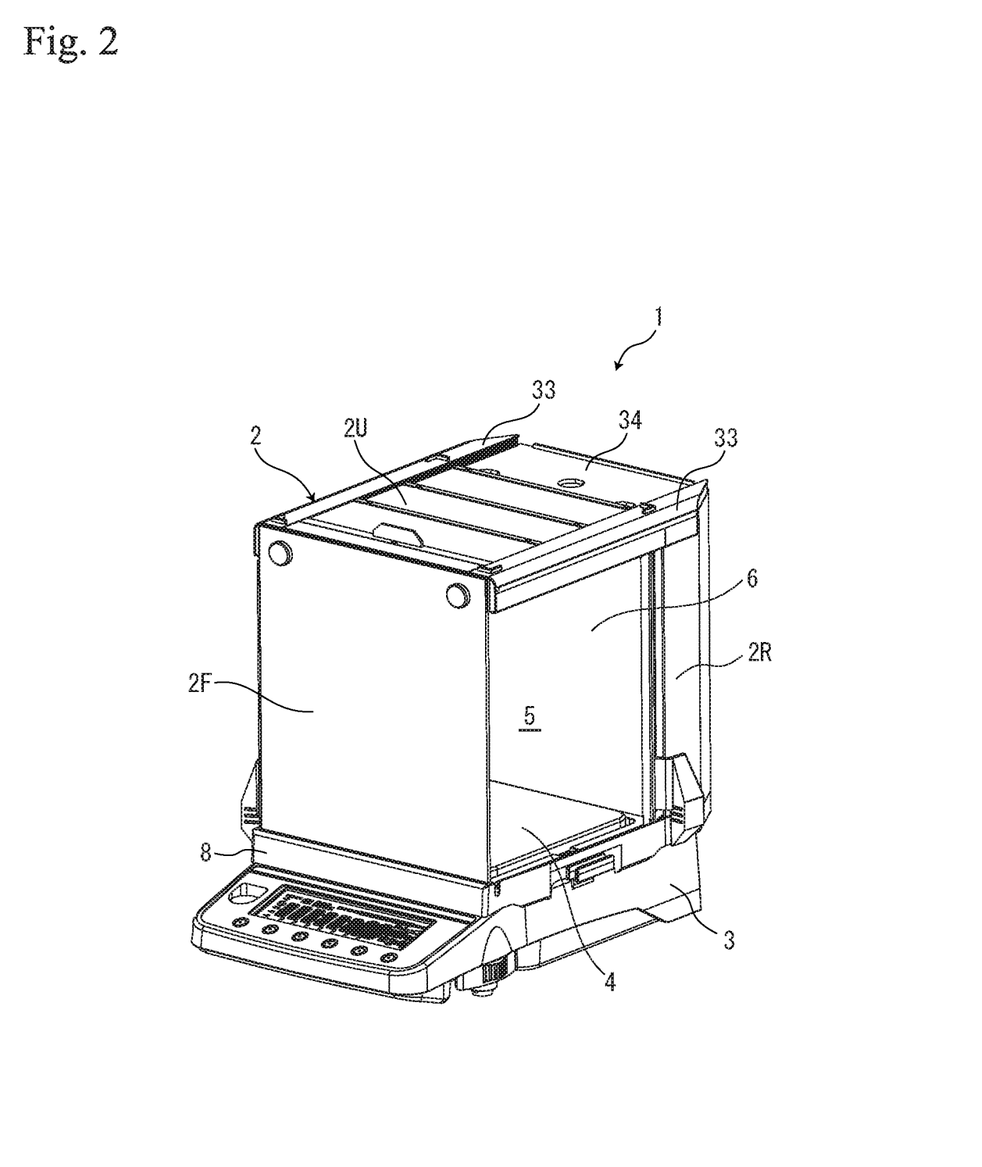
FIG. 2 is a right perspective view illustrating a state where a right sliding door of the protective cover in FIG. 1 is open.
Figure 3:
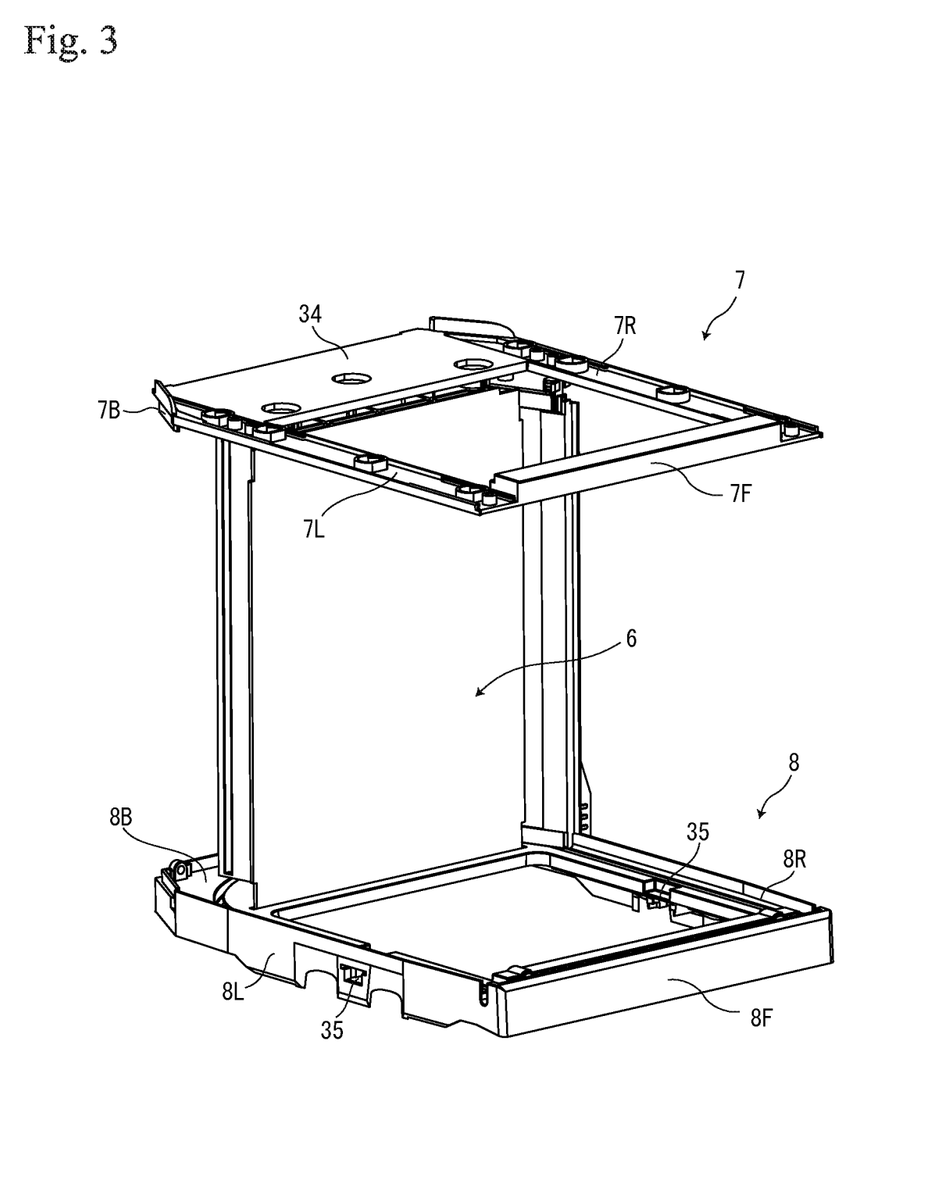
FIG. 3 is a left perspective view of frame bodies of the protective cover in FIG. 1.

FIG. 1 is a right perspective view of an electronic scale including a protective cover according to an embodiment, FIG. 2 is a right perspective view illustrating a state where a right sliding door of the protective cover in FIG. 1 is open, and FIG. 3 is a left perspective view of frame bodies of the protective cover in FIG. 1. The arrow F-B in FIG. 1 represents the front-rear direction, the arrow L-R represents the left-right direction, the arrow U-D represents the up-down direction, and the front, rear, left, right, upper, and lower sides in this specification are described based on these directions.

The reference sign 1 denotes an electronic scale, and the reference sign 2 denotes a protective cover according to the embodiment. The electronic scale 1 includes a housing 3 housing a mass sensor being an electromagnetic balance type or a load cell type, etc., and a weighing pan 4 connected to the mass sensor (FIG. 2). The protective cover 2 is entirely formed into a substantially rectangular box shape, and placed on the housing 3. By closing the protective cover 2, the upper side, the front and rear sides, and the left and right sides of the weighing pan 4 are shut off from the external space, and a weighing chamber 5 is defined.

The protective cover 2 mainly includes a front face plate 2F located in front of the weighing chamber 5, a right sliding door 2R located on the right side, a left sliding door 2L located on the left side, an upper sliding door 2U located on the upper side, and an inner cover member 6, an upper base 7, and a lower base 8 which are frame bodies to support the front face plate and the respective sliding doors.

The upper base 7 and the lower base 8 are disposed one above the other parallel to each other via the inner cover member 6 (FIG. 3). The upper base 7 includes a left frame 7L, a right frame 7R, a front frame 7F, and a rear frame 7B, and the lower base 8 includes a left frame 8L, a right frame 8R, a front frame 8F, and a rear frame 8B.

The inner cover member 6 has a plate portion at the front side, and has a beam portion bulging out rearward in a semicircular columnar shape on the back surface side of the plate portion (refer to FIG. 8 described later). The plate portion of the inner cover member 6 forms a rear surface of the weighing chamber 5. The inner cover member 6 is screw-fixed to the rear frame 8B of the lower base 8 and the rear frame 7B of the upper base 7. On the rear side of the inner cover member 6, a rear cover 31 (FIG. 8) is placed, and between these, the right sliding door 2R or the left sliding door 2L described later is housed.

On the upper base 7 and the lower base 8, an upper guide rail 17 and a lower guide rail 18 are respectively formed. The upper guide rail 17 is formed on a lower surface of the upper base 7, and the lower guide rail 18 is formed on an upper surface of the lower base 8. The upper guide rail 17 extends along the left and right frames 7L and 7R from the front ends of the respective frames, and these extensions are linked in a semicircular shape formed as one rail in the rear frame 7B. The lower guide rail 18 is also formed in the same manner in which the lower guide rail extends along the left and right frames 8L and 8R from the front ends of the respective frames, and these extensions are linked in a semicircular shape as one frame in the rear frame 8B. Detailed shapes of the upper guide rail 17 and the lower guide rail 18 are described later with reference to FIG. 6 and FIG. 7.

On the left and right frames 8L and 8R of the lower base 8, releasing hook portions 35 (FIG. 1, FIG. 3) to remove the protective cover 2 from the main body (housing 3) of the electronic scale 1 are respectively provided. By engaging the releasing hook portions 35 of the protective cover 2 with hook grooves (not illustrated) formed on the housing 3, the protective cover 2 can be integrated with the housing 3 of the electronic scale 1, and the protective cover 2 can be removed by drawing and disengaging the releasing hook portions 35. On the front frame 8F of the lower base 8, a groove into which the front face plate 2F is fitted is formed.

A top cover 34 (FIG. 1, FIG. 3) is formed integrally with the rear frame 7B of the upper base 7, and the upper sliding door 2U is housed above this cover. On the left and right frames 7L and 7R of the upper base 7, decorative covers 33 (FIG. 1) are respectively placed. On each of the upper surfaces of the left and right frames 7L and 7R of the upper base 7, projections for concave-convex fixing the decorative cover 33 are formed at four positions at substantially even intervals.

The front face plate 2F is one glass plate, and a lower end portion is fitted into the groove of the front frame 8F of the lower base 8, and an upper end portion is fixed to the front frame 7F of the upper base 7 by decorative screws.

The upper sliding door 2U is formed of three rectangular glass plates. The three glass plates respectively move along guide grooves (not illustrated) formed in three rows arranged vertically on the inner surfaces of the decorative covers 33, and housed in a stacked state above the top cover 34. At front and rear end portions of each glass plate, ribs that are thicker than the glass plates are respectively formed, and when these ribs interfere with each other, the three glass plates slide integrally in the front-rear direction.

The right sliding door 2R and the left sliding door 2L are structurally bilaterally symmetrical, so that the structure and operation of the right sliding door 2R are described hereinafter, and description of the structure and operation of the left sliding door 2L is omitted.

Figure 4A:
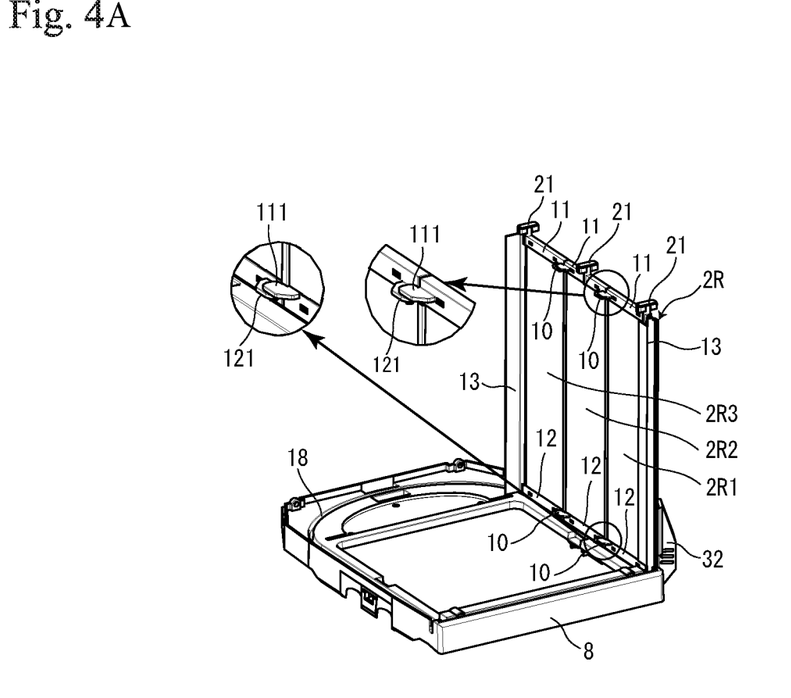
FIG. 4A is a view illustrating a state where the right sliding door is closed.
Figure 4B:
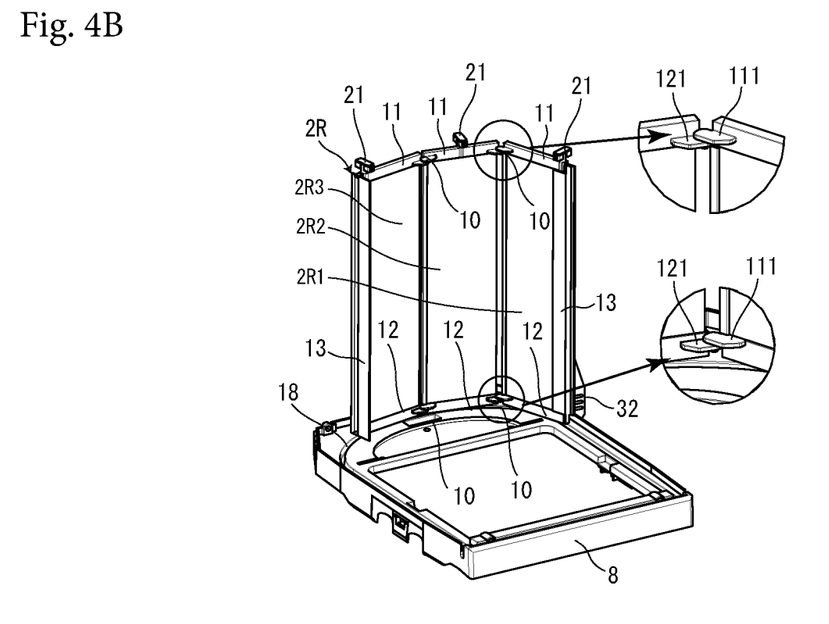
FIG. 4B is a view illustrating a state where the right sliding door is open.

FIG. 4 are views illustrating states of sliding of the right sliding door 2R of the protective cover illustrated in FIG. 1, and FIG. 4 (a) is a view illustrating a state where the right sliding door 2R is closed, and FIG. 4(b) is a view illustrating a state where the right sliding door 2R is open. The right sliding door 2R is formed of three rectangular glass plates. In order from the front side, the glass plates are referred to as glass plates 2R1, 2R2, and 2R3. In each of the glass plates 2R1, 2R2, and 2R3, an upper frame 11 is fitted into an upper edge and a lower frame 12 is fitted into a lower edge, and the frames are bonded and fixed. On side surfaces on the weighing chamber 5 side of the upper frame 11 and the lower frame 12, connecting portions 10 are respectively formed. Each of the connecting portions 10 of the glass plates 2R1 and 2R2 has a connecting projection 111 on a rear end portion in a moving direction. Each of the connecting portions 10 of the glass plates 2R2 and 2R3 has a connecting recess 121 on a front end portion in the moving direction. The connecting projection 111 has a columnar projection on a lower surface, and the connecting recess 121 has a circular hole. By inserting the connecting projections 111 into the connecting recesses 121, the glass plates 2R1, 2R2, and 2R3 are connected turnably horizontally, and accordingly, the three glass plates slide integrally in the front-rear direction.

To a front side surface of the glass plate 2R1 and a rear side surface of the glass plate 2R3, side frames 13 are respectively fixed. The side frame 13 of the glass plate 2R1 comes into contact with the front face plate 2F, and the side frame 13 of the glass plate 2R3 comes into contact with the side frame 13 of the left sliding door 2L side to buffer rear-end collision of the glass plates. On the side frame 13 of the glass plate 2R1, a handle 32 for a sliding operation is formed.

At three positions at the front side of the glass plate 2R1, the center of the glass plate 2R2, and the rear side of the glass plate 2R3, roller portions 21 are respectively formed on the upper frames 11. By these roller portions 21, the right sliding door 2R (the glass plates 2R1, 2R2, and 2R3) is hung from the upper base 7. This is described in detail below.

Figure 5:
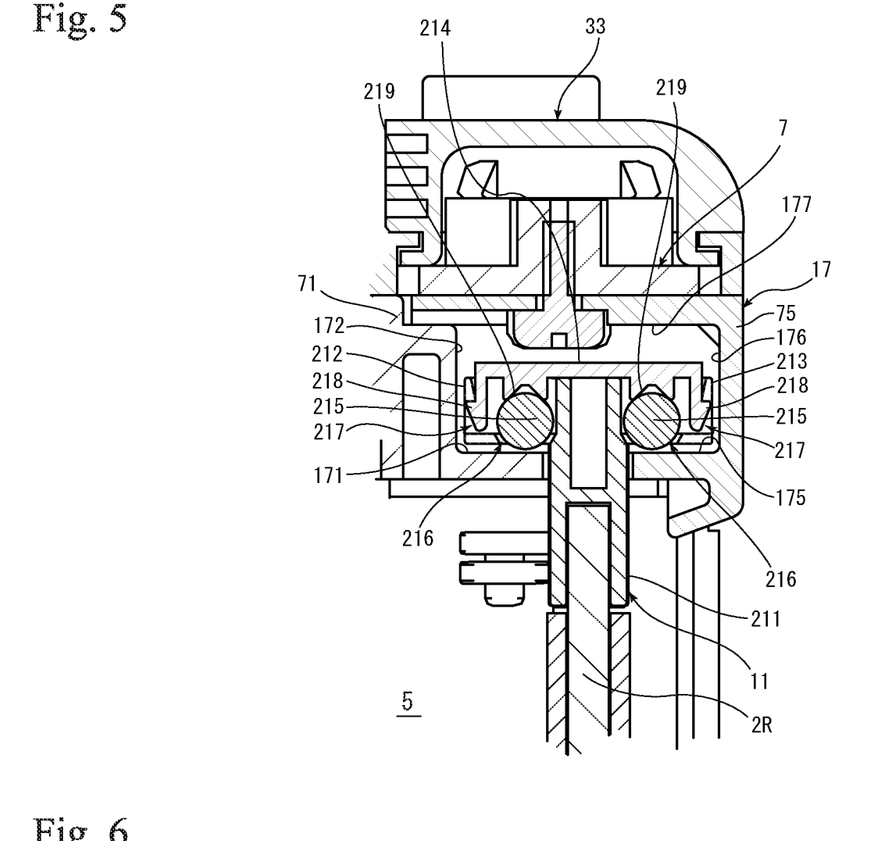
FIG. 5 is a sectional view (sectional view taken along line V-V in FIG. 1) of the periphery of a roller portion of the protective cover in FIG. 1.

FIG. 5 is a sectional view (sectional view taken along line V-V in FIG. 1) of the periphery of the roller portion 21 of the protective cover 2 in FIG. 1. The weighing chamber 5 side is the inside, and the opposite side (non-weighing chamber side) of the weighing chamber 5 is the outside. First, the upper guide rail 17 of the upper base 7 is described.

The upper guide rail 17 includes an inner rail 71 and an outer rail 75. The inner rail 71 has a substantially L shape in cross section, and has a horizontal surface 171 and a vertical surface 172. The outer rail 75 has a substantially J shape in cross section, and has a short horizontal surface 175, a vertical surface 176, and a long horizontal surface 177. The inner rail 71 and the outer rail 75 are disposed so that the vertical surfaces 172 and 176 face each other, and define a rectangular space. The horizontal surface 171 and the short horizontal surface 175 are disposed on the lower side, and the horizontal surface 171 and the short horizontal surface 175 function as guide rails for balls 215 described later. The outer rail 75 is screw-fixed at the long horizontal surface 177 to the lower surface of the upper base 7, and the inner rail 71 is screw-fixed to the lower surface of the upper base 7 by a fixing portion formed to extend inward from the vertical surface 172.

Figure 6:
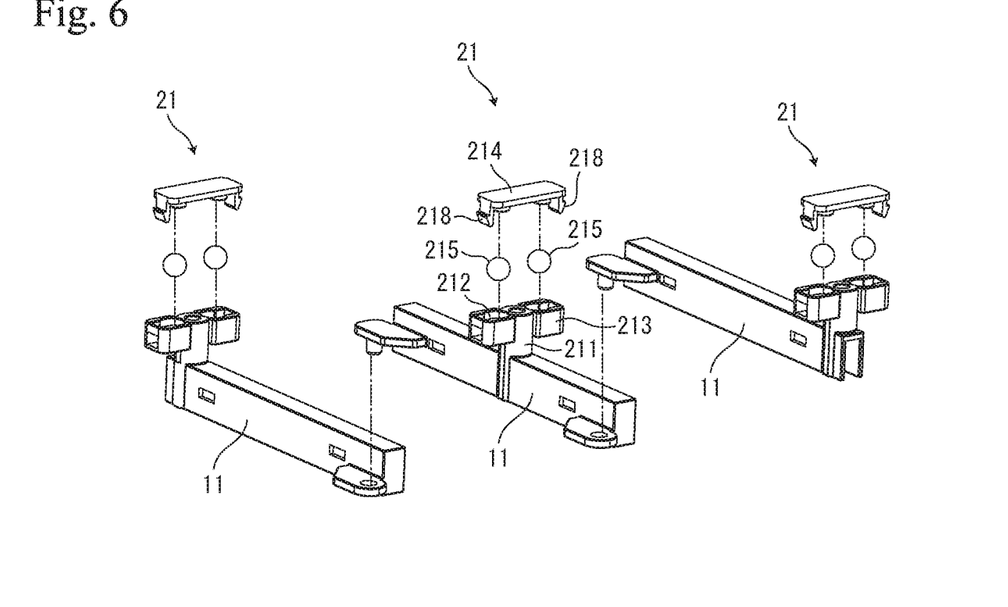
FIG. 6 is an exploded perspective view of an upper frame of the protective cover in FIG. 1.

FIG. 6 is an exploded perspective view of the upper frame 11 of the protective cover 2 in FIG. 1. The roller portion 21 of the upper frame 11 includes a columnar support 211, an inner holding portion 212, an outer holding portion 213, a lid 214, and two balls 215 and 215. The columnar support 211 extends upward from the upper surface of the upper frame 11. The inner holding portion 212 and the outer holding portion 213 extend horizontally in a direction orthogonal to the moving direction of the sliding door from an upper end portion of the columnar support 211, and the inner holding portion 212 is formed on the weighing chamber 5 side, and the outer holding portion 213 is formed on the non-weighing chamber side. The columnar support 211 is disposed from a section between the horizontal surface 171 and the short horizontal surface 175 of the upper guide rail 17, and the roller portion 21 is disposed in the rectangular space.

Each of the holding portions 212 and 213 has a circular cylindrical space, opens upward, and has, in a lower surface, a through-hole 216 to expose a portion of the ball 215 downward. The through-hole 216 is formed adjacent to the columnar support 211, and inclined so as to narrow downward from the upper side. In a side surface of the inner holding portion 212 on the weighing chamber 5 side and a side surface of the outer holding portion 213 on the non-weighing chamber side, engagement holes 217 into which claw portions 218 described later are inserted are respectively formed.

The lid 214 is formed into a substantially rectangular shape having a size to cover upper portions of the holding portions 212 and 213. At both ends of the lid 214, claw portions 218 extending downward are respectively formed, and when the lid 214 is inserted along the inner walls of the holding portions 212 and 213, the engagement holes 217 and the claw portions 218 interfere with each other and are fixed so as to prevent the lid from coming off. On a lower surface of the lid 214, at positions corresponding to the respective through-holes 216 of the holding portions 212 and 213, presser portions 219 are formed. The presser portions 219 extend downward in columnar forms, and have shapes with lower surfaces conically hollowed out, and lower end portions that come into line contact with the balls 215.

The balls 215 are disposed one each in the holding portions 212 and 213. The balls 215 may be made of a metal, but preferably made of a resin with low sliding friction, for example, polyamide (PA), polytetrafluoroethylene (PTFE), and particularly preferably, polyoxymethylene (POM) with high wear resistance. The balls 215 come into line contact with the horizontal surfaces 171 and 175 of the upper guide rail 17 and the presser portions 219 in the up-down direction, and roll on the horizontal surfaces 171 and 175 while being positioned by the through-holes 216 and the columnar support 211 in the left-right direction (direction orthogonal to the moving direction).

Figure 7:
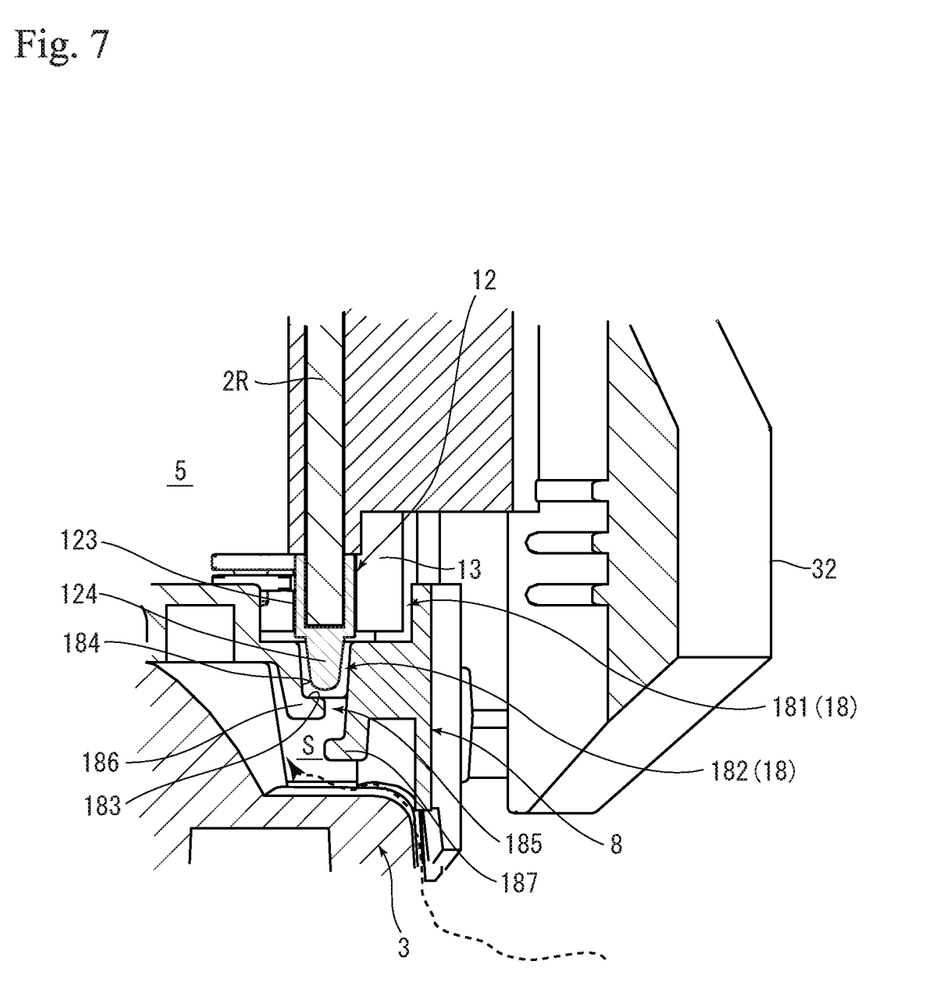
FIG. 7 is a sectional view (sectional view taken along line VII-VII in FIG. 1) of the periphery of a lower base of the protective cover in FIG. 1.

Next, the periphery of the lower base 8 is described. FIG. 7 is a sectional view (sectional view taken along line VII-VII in FIG. 1) of the periphery of the lower base 8 of the protective cover 2 in FIG. 1. To a lower edge of the right sliding door 2R, the lower frame 12 is fixed. The lower frame 12 has a fixing portion 123 having a concave groove to be fixed to the right sliding door 2R, and on the lower side of the fixing portion 123, a guided portion 124 having a substantially truncated cone shape in cross section.

The lower guide rail 18 is directly formed on the upper surface of the lower base 8 (refer to FIG. 4 as well). The lower guide rail 18 has a first groove 181 and a second groove 182 formed on a bottom surface of the first groove. The first groove 181 is formed so as to raise an outer wall in the lower guide rail 18, and functions to prevent wind from entering from the outside of the weighing chamber 5. The second groove 182 guides the guided portion 124.

However, as described below, none of the lower end portions (the side frames 13 and the guided portion 124) of the right sliding door 2R come into contact with the lower guide rail 18 (the first groove 181 and the second groove 182).

The first groove 181 is formed to have a width that includes the side frame 13, and a depth that causes a gap of 0.5 to 0.7 millimeters to be formed between the bottom surface of the first groove 181 and the lower surface of the side frame 13. The second groove 182 is formed slightly larger than a width of the guided portion 124 of the lower frame 12, and has a width that causes a gap of 0.5 to 0.7 millimeters to be formed between a peripheral surface 184 of the second groove 182 and a side surface of the guided portion 124, and a depth that causes a gap of 0.8 to 1.0 millimeters to be formed between a bottom surface 183 of the second groove 182 and a lower end portion of the guided portion 124.

Further, in the bottom surface 183 of the second groove 182, a through-hole 185 is formed. An outer wall portion 187 on the non-weighing chamber side and an inner wall portion 186 on the weighing chamber 5 side of the second groove 182 are formed into substantially L shapes in cross section, and the outer wall portion 187 is formed to be longer downward than the inner wall portion 186.

By the above-described elements, the following effects are obtained with the protective cover 2. The right sliding door 2R of the protective cover 2 slides on the upper guide rail 17 of the upper base 7 by the roller portion 21 of the upper frame 11. That is, since the right sliding door 2R is top-railed, so that the lower end portion of the right sliding door 2R does not come into contact with the lower guide rail 18. Therefore, even when a sample spills around the door at the time of a weighing operation, it is difficult for it to attach to the right sliding door 2R and the lower guide rail 18 as contamination.

Moreover, in the roller portion 21, the balls 215 are disposed respectively on the inner holding portion 212 and the outer holding portion 213. That is, the right sliding door 2R is supported not at one end but at both ends, and the balance when the door is moved is also good.

Further, by making a hole 185 in the lower guide rail 18, a sample falling on the lower guide rail 18 falls to a portion under the lower base 8, and is discharged to the outside of the protective cover 2. In a conventional protective cover 2, to maintain smooth movement of the sliding door, the lower guide rail needs to be cleaned, however, this cleaning is no longer necessary or can be reduced in frequency in the present embodiment.

Moreover, an air flow passage is made complicated by the shapes of the outer wall portion 187 and the inner wall portion 186 of the lower guide rail 18, so that wind from the hole 185 toward the weighing chamber 5 is blocked. In the present embodiment, wind (the dashed line arrow in FIG. 7) from the outside of the weighing chamber 5 is considered to enter from a small gap between the lower base 8 and the housing 3. However, the outer wall portion 187 is formed to be longer than the inner wall portion 186, and the outer wall portion 187 and the inner wall portion 186 are L-shaped, so that the route leading to the weighing chamber 5 has a labyrinthine structure, and wind convects in the space S between the lower base 8 and the housing 3, and hardly reaches the weighing chamber 5. When bent portions of lower end portions of the outer wall portion 187 and the inner wall portion 186 are shaped sloped, a contaminate easily slips down due to the slopes while the above-described labyrinth effect is maintained, and this is more preferable.

Use of a so-called ball bearing including metal balls, inner and outer races, and a retainer, in place of the roller portion 21 of the present embodiment, is not preferable. As a top-railed sliding door frequently used in a door section of a vehicle, etc., there is one using a ball bearing for linear motion so as to reduce frictional resistance. However, if such a ball bearing is used, only linear movement is obtained in principle, and when the door is fully opened, a problem occurs in which the door protrudes rearward. To avoid this problem in the protective cover for a weighing instrument, the depth of the scale main body must be designed to be large so as to prevent the door from protruding, however, this is incompatible with a demand for more compact size of the scale.

On the other hand, the sliding door 2R of the protective cover 2 of the present embodiment is structured so that the balls 215 disposed inside the unique holding portions 212 and 212 roll on the unique upper guide rail 17, and this structure can adapt to curved motion. In addition, the upper guide rail 17 may be entirely formed of a resin, for example, ABS resin with well-balanced mechanical properties and high general versatility, so that it can be configured inexpensively.

Figure 8:
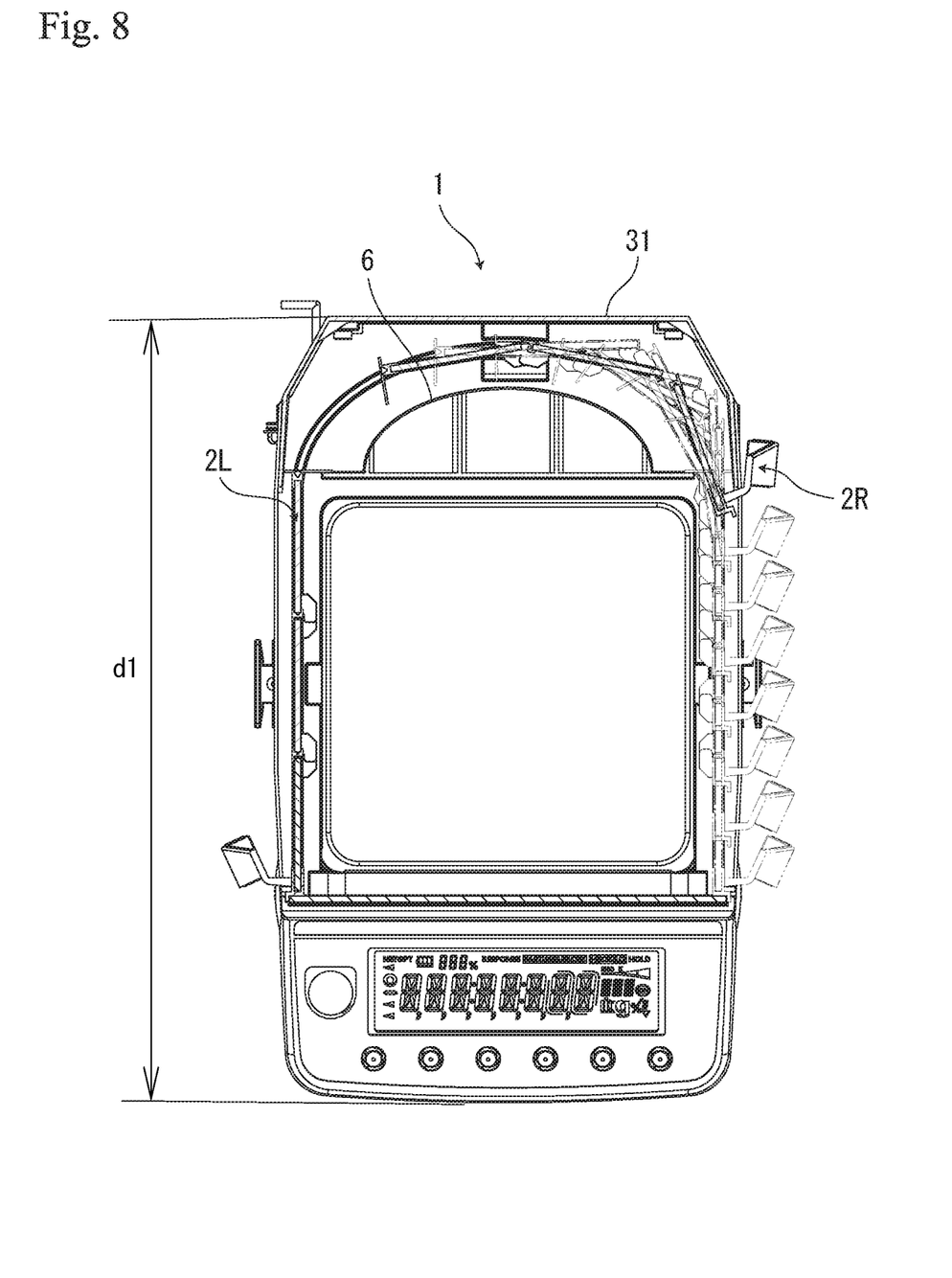
FIG. 8 is a sectional view (sectional view taken along line VIII-VIII in FIG. 1) of the electronic scale in FIG. 1.

FIG. 8 is a sectional view (sectional view taken along line VIII-VIII in FIG. 1) of the electronic scale 1 in FIG. 1. In FIG. 8, the left sliding door 2L is closed, and a movement locus of the right sliding door 2R is illustrated. Each of the sliding doors 2L and 2R is formed by dividing a glass plate into three parts and connecting the three plates turnably, and supported by the roller portion 21 so as to enable curved motion, so that the sliding doors can curve at a radius of curvature of 50 mm to 100 mm. Therefore, the sliding doors 2L and 2R do not protrude rearward and can be housed in the back surface of the weighing instrument when they are fully opened. The depth dl of the scale main body is downsized by approximately 30% as compared with the depth when using a sliding door that moves only linearly and protrudes rearward, so that space-saving in the depth direction is realized.

A preferred embodiment of the protective cover 2 is described above, however, it can be modified based on knowledge of a person skilled in the art, and such a modified embodiment is also included in the scope of the present invention.

REFERENCE SIGNS LIST

1 Electronic scale
2 Protective cover
5 Weighing chamber
2R Right sliding door
2L Left sliding door
7 Upper base
8 Lower base
11 Upper frame
12 Lower frame
17 Upper guide rail
18 Lower guide rail
181 First concave groove
182 Second concave groove
183 Bottom surfaced of second concave groove
185 Hole
186 Inner wall portion (wall portion on weighing chamber side)
187 Outer wall portion (wall portion on non-weighing chamber side)
21 Roller portion
212 Inner holding portion
213 Outer holding portion
214 Lid
215 Ball
216 Through-hole

What is claimed is:

1. A protective cover for a weighing instrument comprising:
   a sliding door defining a weighing chamber;
   an upper frame formed at an upper edge of the sliding door;
   a lower frame formed at a lower edge of the sliding door;
   an upper guide rail disposed on the upper frame; and
   a lower guide rail disposed under the lower frame,
   wherein between the upper guide rail and the upper frame, balls are disposed at a plurality of positions in a moving direction of the sliding door,
   wherein on an upper surface of the upper frame, at each of the plurality of positions, a roller portion is formed for holding the balls that includes:

a pair of holding portions that each holds the balls in a rollable manner both on a weighing chamber side and a non-weighing chamber side, a columnar support that separates the holding portions, through-holes formed in a lower surface of the holding portions to expose the balls downward, and presser portions that cover and press down the balls, and wherein the upper guide rail has a pair of horizontal surfaces each of which suspends one of the holding portions, and the upper guide rail suspends the upper frame via the roller portion, and the balls come into line contact with the horizontal surfaces of the upper guide rail and the presser portions in up-down direction and roll on the horizontal surfaces being positioned by the through-holes and the columnar support in a direction orthogonal to the moving direction.

2. The protective cover for a weighing instrument according to claim 1, wherein a lower end portion of the lower frame does not come into contact with a bottom surface of the lower guide rail.

3. A protective cover for a weighing instrument comprising:

a sliding door defining a weighing chamber;

an upper frame formed at an upper edge of the sliding door;

a lower frame formed at a lower edge of the sliding door;

an upper guide rail disposed on the upper frame; and a lower guide rail disposed under the lower frame, wherein the upper guide rail suspends the upper frame, and between the upper guide rail and the upper frame, balls are disposed at a plurality of positions in a moving direction of the sliding door, wherein a through-hole is formed in a bottom surface of the lower guide rail.

4. The protective cover for a weighing instrument according to claim 3, wherein a wall portion of the lower guide rail positioned on the non-weighing chamber side not being a side of the weighing chamber is formed to become longer downward than a wall portion positioned on the weighing chamber side.

5. The protective cover for a weighing instrument according to claim 1, wherein the sliding door is formed by turnably connecting three plates juxtaposed to each other in a moving direction of the sliding door.

6. The protective cover for a weighing instrument according to claim 2, wherein the sliding door is formed by turnably connecting three plates juxtaposed to each other in a moving direction of the sliding door.

7. The protective cover for a weighing instrument according to claim 3, wherein the sliding door is formed by turnably connecting three plates juxtaposed to each other in a moving direction of the sliding door.

8. The protective cover for a weighing instrument according to claim 4, wherein the sliding door is formed by turnably connecting three plates juxtaposed to each other in a moving direction of the sliding door.

9. A protective cover for a weighing instrument comprising:

a sliding door defining a weighing chamber;

an upper frame formed at an upper edge of the sliding door;

a lower frame formed at a lower edge of the sliding door;

an upper guide rail disposed on the upper frame; and a lower guide rail disposed under the lower frame, wherein between the upper guide rail and the upper frame, balls are disposed at a plurality of positions in a moving direction of the sliding door, wherein on an upper surface of the upper frame, at each of the plurality of positions, a roller portion is formed for holding the balls that includes:

a pair of holding portions that each holds the balls in a rollable manner both on a weighing chamber side and a non-weighing chamber side, a columnar support that separates the holding portions, and wherein through-holes formed in a lower surface of the holding portions expose the balls downward and allow the balls to contact horizontal surfaces of the upper guide rail.

* * * * *